J. F. CARSON.
AUTOMOBILE LOCK.
APPLICATION FILED DEC. 29, 1916.

1,226,467.

Patented May 15, 1917.

UNITED STATES PATENT OFFICE.

JOHN F. CARSON, OF PHILADELPHIA, PENNSYLVANIA, ASSIGNOR TO ESSANSEE LOCK COMPANY, A PARTNERSHIP ASSOCIATION COMPOSED OF THE SAID JOHN F. CARSON AND CECIL H. SHERMAN, BOTH OF PHILADELPHIA, PENNSYLVANIA.

AUTOMOBILE-LOCK.

1,226,467.     Specification of Letters Patent.     Patented May 15, 1917.

Application filed December 29, 1916. Serial No. 139,536.

*To all whom it may concern:*

Be it known that I, JOHN F. CARSON, a citizen of the United States, residing at the city of Philadelphia, in the county of Philadelphia and State of Pennsylvania, have invented certain new and useful Improvements in Automobile-Locks, of which the following is a specification.

My invention relates to a device for locking an automobile against theft; the same being arranged to mechanically engage the high gear foot lever and the reverse gear foot lever at one and the same time and to extend crosswise of the emergency lever and embracing an eye-bolt for a locking means to be coupled to the same; thereby the motor is rendered inoperative and the car prevented from movement in any direction; and in such connection my invention relates to the particular constructive arrangement of the said device for performing the above defined functions, in use.

The nature, scope and characteristic features of my said invention will be more fully understood from the following description taken in connection with the accompanying drawings forming part hereof, in which—

Figure 1:
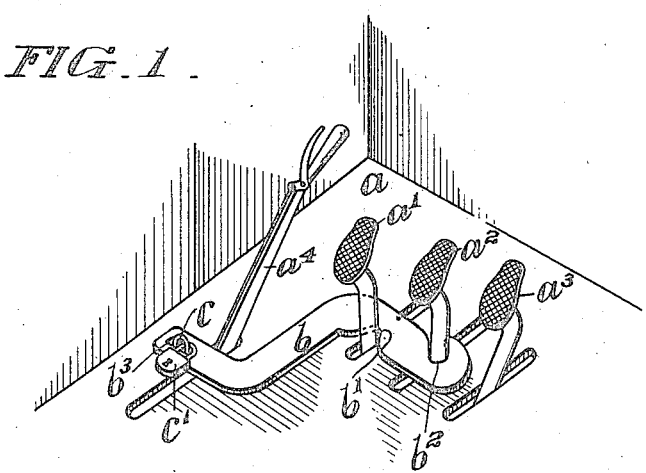
Figure 1, is a perspective view of an automobile-lock, embodying in structural arrangement my said invention.
Figure 2:
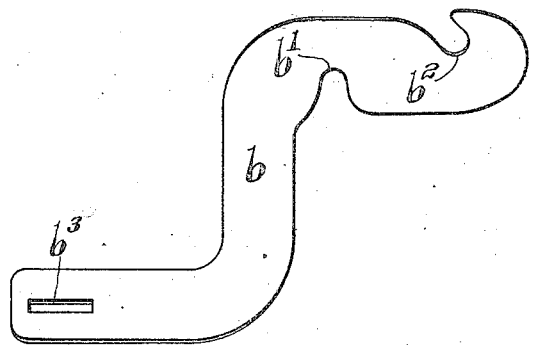
Fig. 2 is a top or plan view of the locking device, showing detailed structural arrangement of the same, in its embodiment of salient features thereof.
Figure 3:
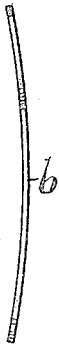
Fig. 3, is an end view, showing the bent form of the said device.

Referring to the drawings $a$, is the interior front portion of the car, showing the high gear pedal foot lever $a^1$, the reverse gear pedal foot lever $a^2$, the brake pedal foot lever $a^3$, and the emergency hand brake lever $a^4$, all operable in forward and backward directions.

The locking device $b$, of my said invention positioned for use is in form substantially reversely Z-shape, as shown. The upper right projection of the device in both surfaces is provided with different shape notches $b^1$ and $b^2$, in respect to each other, that is, the notch $b^2$, is substantially goose-neck in form. These notches respectively, as shown in Fig. 1, engage the high gear foot lever $a^1$, and the reverse gear foot lever $a^2$, at one and the same time and the lower left projection of the locking device extends across in rear of the emergency brake lever $a^4$, in the extreme forward position thereof. In the body of the left hand projection is provided a slot $b^3$, through which an eye-bolt $c$, extends and coupled thereto is an ordinary locking-means $c^1$, as clearly shown in Fig. 1, whereby with the said high gear foot lever $a^1$ engaged by the device and with the reverse gear foot lever $a^2$, both in gear, the motor is positively rendered inoperative and in engaging the high gear foot lever and reverse gear foot lever the car is prevented from movement, in any direction. The device $b$, is designed for instant use to lock the car against reasonable possibility of theft unless the locking-means $c^1$, and the eye-bolt $c$, are respectively smashed to release the device from the position it occupies as illustrated in Fig. 1 of the drawings.

Having thus described the nature and objects of my invention, what I claim as new and desire to secure by Letters Patent is:—

An automobile unit-locking device of substantially inverted Z-shape, in outline, one right angular portion having a notch and a recess, the angularity of the notch with respect to the recess differing from each other and the opposite right angular portion of said device provided with a slot for engaging the eye-bolt of a locking-means, the arrangement being such as to permit of the engagement of the respective notch and recess of said device with the high gear foot lever and reverse gear lever and the emergency brake in the forward shifted position and said locking-means engaged with the eye-bolt of the car, behind said emergency brake lever, substantially as and for the purposes described.

In witness whereof, I have hereunto set my signature in the presence of two subscribing witnesses.

JOHN F. CARSON.

Witnesses:
J. WALTER DOUGLASS,
HELEN LENNON.